(12) United States Patent
Dent et al.

(10) Patent No.: US 10,151,296 B2
(45) Date of Patent: Dec. 11, 2018

(54) BLADE FOR A WIND TURBINE AND A METHOD FOR MANUFACTURING A BLADE FOR A WIND TURBINE

(71) Applicant: Vestas Wind Systems A/S, Aarhus N. (DK)

(72) Inventors: Dave Dent, Shalfleet (GB); Jonas Romblad, Nexo (DK); Sonia Salcedo Serra, Arhus C. (DK)

(73) Assignee: Vestas Wind Systems A/S, Aarhus N (DK)

( * ) Notice: Subject to any disclaimer, the term of this patent is extended or adjusted under 35 U.S.C. 154(b) by 341 days.

(21) Appl. No.: 14/909,320

(22) PCT Filed: Jul. 30, 2014

(86) PCT No.: PCT/DK2014/050232
§ 371 (c)(1),
(2) Date: Feb. 1, 2016

(87) PCT Pub. No.: WO2015/014370
PCT Pub. Date: Feb. 5, 2015

(65) Prior Publication Data
US 2016/0177916 A1    Jun. 23, 2016

(30) Foreign Application Priority Data

Aug. 2, 2013    (DK) .................................. 2013 70424

(51) Int. Cl.
*F03D 1/06* (2006.01)
*F03D 13/10* (2016.01)

(52) U.S. Cl.
CPC ......... *F03D 1/0641* (2013.01); *F03D 1/0675* (2013.01); *F03D 13/10* (2016.05);
(Continued)

(58) Field of Classification Search
CPC ................. F03D 1/0641; F03D 1/0675; F05B 2240/301; F05B 2240/304; F03B 13/10
(Continued)

(56) References Cited

U.S. PATENT DOCUMENTS 2,562,227 A * 7/1951 Zobel ........................ B64C 3/14
114/274
4,643,646 A    2/1987 Hahn et al.
(Continued)

FOREIGN PATENT DOCUMENTS

EP        2022979 A1    2/2009
EP        2169216 A2    3/2010
(Continued)

OTHER PUBLICATIONS

European Patent Office, International Search Report and Written Opinion issued in International Application No. PCT/DK2014/050232 dated Oct. 7, 2014.
(Continued)

*Primary Examiner* — Igor Kershteyn
*Assistant Examiner* — Topaz L. Elliott
(74) *Attorney, Agent, or Firm* — Wood Herron & Evans LLP

(57) ABSTRACT

A blade for a wind turbine defines an airfoil with a leading edge section and a trailing edge section, notably a flat-back trailing edge. A rounded connecting section interconnects a pressure side section of the airfoil and the trailing edge section. The rounded connecting section attaches to the pressure side section at a transition point, in which the pressure side section's tangent does not coincide with the rounded connecting section's tangent, so that the outer surface of the airfoil has a sharp corner at said transition point. The truncated radius, i.e. geometrical discontinuity, thus formed at the transition between the pressure side
(Continued)

section and the trailing edge section increases the aerodynamically effective surface of the pressure side and enables forced and hence controlled flow separation without compromising ease of manufacture and structural stability of a fiber-reinforced structure making up a shell of the blade.

11 Claims, 3 Drawing Sheets

(52) U.S. Cl.
CPC ....... *F05B 2230/31* (2013.01); *F05B 2230/41* (2013.01); *F05B 2240/301* (2013.01); *F05B 2250/71* (2013.01); *F05B 2250/711* (2013.01); *Y02E 10/721* (2013.01); *Y02P 70/523* (2015.11)

(58) Field of Classification Search
USPC ...................................................... 416/223 R
See application file for complete search history.

(56) References Cited

U.S. PATENT DOCUMENTS

| | | | |
|---|---|---|---|
| 8,419,373 | B1 | 4/2013 | Fukami |
| 9,303,622 | B2* | 4/2016 | Attey ...................... F03D 3/002 |
| 9,377,005 | B2* | 6/2016 | Yarbrough ............ F03D 1/0641 |
| 9,897,067 | B2* | 2/2018 | Grasso .................. F03D 1/0633 |
| 2010/0143146 | A1 | 6/2010 | Bell et al. |
| 2011/0286853 | A1 | 11/2011 | Kristensen et al. |

FOREIGN PATENT DOCUMENTS

| | | |
|---|---|---|
| EP | 2322793 A1 | 5/2011 |
| EP | 2604856 A1 | 6/2013 |

OTHER PUBLICATIONS

Danish Patent and Trademark Office, Search Report issued in Application No. PA 2013 70424 dated Mar. 12, 2014.

* cited by examiner

BLADE FOR A WIND TURBINE AND A METHOD FOR MANUFACTURING A BLADE FOR A WIND TURBINE

TECHNICAL FIELD

The present invention relates to a blade for a wind turbine, notably to the structure of an airfoil of the blade near its trailing edge section. The invention also relates to a method for manufacturing such a blade.

BACKGROUND OF THE INVENTION

Shells for wind turbine blades forming the aerodynamic profile of the blades, i.e. the airfoils, are commonly manufactured by laying up of fibre reinforcements in respective upper and lower mould halves. The upper and lower mould halves are used to form two half shells—a first half shell provides the suction surface of the blade and a second half shell provides the pressure surface of the blade. The two half shells are joined together along a leading edge and a trailing edge to form the blade.

To fabricate each shell half, fibre reinforcement material (such as glass fibre and/or carbon fibre) is laid up in each mould half. Next, a vacuum film is placed over the fibre material. The vacuum film is commonly referred to as 'vacuum bagging film' and is sealed against the half mould to eliminate air leaks and create a substantially sealed volume containing the fibre reinforcement material. Air is then removed from the substantially sealed volume using a vacuum pump. The vacuum pump extracts air from the substantially sealed volume and from the lay-up of fibre reinforcement material to create an effective vacuum, which causes the vacuum film to apply pressure to the fibre reinforcement material. Under the vacuum, resin (typically thermoset resin) is infused into the fibre material and the mould half is heated to cure the resin. When both half shells have been manufactured in their respective half moulds, the two half moulds are brought together to close the mould and to adhesively join the half shells along the leading edge and the trailing edge to form the blade.

Instead of the resin being infused into the substantially sealed volume, the fibre reinforcements may be pre-impregnated with a thermoset resin (i.e. pre-preg fibre material), which is heated to above its glass transition temperature under the vacuum, to cause the resin to distribute evenly within the mould and bond the fibre reinforcements together.

The trailing edge section of wind turbine blades poses a particular challenge in relation to manufacturing by moulding. From an aerodynamic perspective, it may be desired to minimize the thickness of the trailing edge of airfoils for wind turbine blades in order to minimize aerodynamic drag. For obvious reasons, however, indefinitely thin trailing edges cannot be achieved, and accordingly wind turbine blades generally have a certain trailing edge thickness of between a few millimeters and a few centimeters. So-called flat back profiles with a considerable trailing edge thickness have been proposed in the prior art. It will hence be appreciated that the trailing edge effectively has a non-zero thickness in traditional blades and flat-back structures alike. Upper and lower mould halves used for the manufacture of such blades are normally split along a pressure side, i.e. lower surface of the blade. Accordingly, the upper mould half defining and accommodating the suction side of the blade also defines the flat-back trailing edge section and accommodates the fibre reinforcement, which forms the trailing edge section, the fibre reinforcement being generally provided as a mat. At the trailing edge of the blade, the blade forms a 90° or almost 90° corner, in which fibre mats may not sit effectively unless the corner is rounded. In order to avoid a fragile resin rich area in such corners, a transition between the pressure side surface of the blade and the trailing edge may hence be rounded, i.e. provided with a corner radius. Such a radius may, however, compromise aerodynamic performance of the blade, because it reduces the aerodynamically effective area of the airfoil and impedes controlled flow separation.

SUMMARY OF THE INVENTION

On the above background it is an object of preferred embodiments of the invention to provide a blade for a wind turbine, which avoids resin rich corner areas as discussed above and yet improves aerodynamical efficiency of the blade.

In a first aspect, the invention provides a blade for a wind turbine, the blade extending in its lengthwise direction from a hub portion to a tip portion of the blade and in its chordwise direction from a leading edge to a trailing edge of the blade, wherein a major part of the blade defines an airfoil in a cross section extending transversely to the lengthwise direction, the airfoil having an outer surface defining:
  a leading edge section and trailing edge section;
  a pressure side section and an opposed suction side section extending between and interconnecting the leading edge section and the trailing edge section;
  a rounded connecting section interconnecting the pressure side section and the trailing edge section,
wherein the rounded connecting section attaches to the pressure side section at a transition point, in which the pressure side section's tangent does not coincide with the rounded connecting section's tangent, so that the outer surface of the airfoil has a sharp corner at said transition point.

The present invention hence provides a truncated radius at the corner between the pressure side section and the trailing edge section. The truncated radius renders it possible to extend the pressure side surface of the airfoil, as the length of the rounded connecting section may be reduced, thereby increasing that surface area of the blade, which is available for generating aerodynamic lift. Moreover, as the geometrical discontinuity between the pressure side surface and the trailing edge section provides a sharp corner, flow separation may be forced at the transition point, at which the rounded connecting section attaches to the pressure side. At that point flow separation is desirable, notably in respect of flat back airfoils, because such airfoils may generate steep pressure gradients, which may lead to aerodynamically destructive flow separation from the suction surface. Accordingly, flow separation at the transition point at the pressure side may be utilized as a separation control technique, which prevents premature separation from the suction side.

According to the invention, the rounded connecting section attaches to the pressure side section at a transition point. At the transition point, a tangent of the pressure side section does not coincide with a tangent of the rounded connecting section, so that the outer surface of the airfoil has a sharp corner at the transition point. By "tangent" is meant the straight line that touches the pressure side section or rounded connecting section and is a straight line approximation to the pressure side section or rounded connecting section at the transition point.

While the sharp corner at the transition point resulting from the non-coinciding tangents of the pressure side section and the rounded connecting section brings about the above aerodynamical effects, the present invention preserves the benefits of a fully rounded connecting section in relation to ease of manufacture. This is because a sharp 90° corner, in which fibre reinforcements, such as fibre mats, may not sit effectively and hence may cause structurally weak resin rich areas, is avoided.

Along at least a part of the length of the blade in its spanwise direction, i.e. from a hub to a tip portion thereof, the trailing edge section is preferably a flat back trailing edge. The ratio between a height of the flat back trailing edge and a chord length may be between 2% and 15%. In the spanwise direction the blade preferably has a flat back trailing edge along 30% of a spanwise length of the blade, from a cylindrical root section towards the tip. The flat back trailing edge could also extend from the root of the blade to 60% of the spanwise length of the blade.

In preferred embodiments of the invention, the rounded connecting section's tangent forms an angle of 60° or less to the pressure side's tangent, such as from about 10° to about 60°, such as an angle in the range from about 25° to about 35°, the angle being defined between that part of the pressure side's tangent, which extends away from airfoil (i.e. in direction of the flow across the airfoil), and that part of the connecting section's tangent, which extends towards the suction side of the airfoil.

Generally, a ratio between a curvature radius of the rounded connecting section and a height of the trailing edge section defined as a straight-line distance between the pressure side and the suction side of the airfoil at the trailing edge section may be between 0.01 and 0.2. Or, this ratio may be between 0.01 and 1. The height of the trailing edge section may be between 1 and 100 mm or more, such as between 1 and 200 mm, or between 1 and 500 mm.

The height of the trailing edge section may reduce toward the tip of the blade at least over an outbound portion of the length of the blade, i.e. along a portion of that part of the blade, which extends from the shoulder of the blade (that part of the blade having the largest chord dimension) to the tip of the blade. For example, the height of the trailing edge section may gradually reduce, so that the trailing edge height reduces when the chord dimension of the airfoil reduces along the length of the blade. Thus, a height of the trailing edge section may be larger at a first point along the length of the blade than at a second point along the length of the blade, the second point being closer to the tip portion than the first point.

The rounded connecting section may, in preferred embodiments of the invention, have a curvature radius of about 10 mm to about 50 mm. However, even larger radii of curvature are envisaged, notably in respect of flat-back structures with a substantial flat-back height of the trailing edge section.

In order to optimize aerodynamic performance of the blade, the thickness of the blade may increase towards the trailing edge section of the airfoil in the vicinity of the trailing edge section. Preferably, the thickness increases along the rearmost 1-5% of the length of the airfoil. In this context, the thickness of the airfoil is defined as a straight-line distance between the pressure side and the suction side when measured in a direction perpendicular to the chordline. The area of increased thickness may be provided as a separate element, preferably a non-structural element made e.g. from foam or rubberised material, attached to a main part of the blade.

In a second aspect, the invention provides a method of manufacturing a blade structure for a wind turbine, the blade extending in its lengthwise direction from a hub portion to a tip portion of the blade and in its chordwise direction from a leading edge to a trailing edge of the blade, wherein a major part of the blade defines an airfoil in a cross section extending transversely to the lengthwise direction, the airfoil having an outer surface defining:
   a leading edge section and trailing edge section;
   a pressure side section and an opposed suction side section extending between and interconnecting the leading edge section and the trailing edge section;
   a rounded connecting section interconnecting the pressure side section and the trailing edge section,
wherein the rounded connecting section attaches to the pressure side section at a transition point, in which the pressure side section's tangent does not coincide with the rounded connecting section's tangent, so that the outer surface of the airfoil has a sharp corner at said transition point,
said method comprising the steps of:
   providing a mould for the blade or a segment thereof, the mould comprising a first mould half shaped to define the suction side of the airfoil, and a second mould half shaped to define to define the pressure side of the airfoil, and wherein, in a trailing edge section of the airfoil, the second mould half further defines the trailing edge section of the airfoil;
   providing layers of a fibrous material in the respective first and second mould halves;
   assembling the first and second mould halves;
   filling a resin into the mould;
   curing the resin;
   removing the structure thus manufactured from the mould.

It will be understood that the method according to the second aspect of the invention is suitable for manufacturing at least a substantial part of a wind turbine blade according to the first aspect of the invention.

The layers of fibrous material preferably form respective first and second blade shell parts in the mould halves. The layers of fibrous material may, for example, be provided as mats, such as uni- or multidirectional prepregs, which, preferably, are dry to touch. They may be pre-coated with a resin, or they may be void of resin. The resin which is filled into the mould upon assembly of the mould halves may be a thermoplastic or a thermosetting resin. It may be filled into the mould by any injection or infusion process known per se.

The structure formed by the method according to the second aspect of the invention may constitute at least a substantial part of the wind turbine blade. Further steps, such as polishing, painting, mounting of lightning receptors and lightning down conductors, or mounting of means for attaching the blade to a wind turbine hub may be carried out following the steps of the method according to the second aspect of the invention in order to arrive at a completed wind turbine blade. The structure formed may be a segment of a blade, which is to be assembled with further blade segments, which together make up the entire blade.

It should be understood that the term "mould half" does not necessarily designate exactly one half in terms of weight or volume of the blade structure. The term "mould half" should rather be understood to comprise an upper or lower part of the mould structure.

The second mould half is shaped to define the trailing edge section of the airfoil; in other words, the mould is split along the suction side of the blade. Thanks to this feature, the rounded connecting section and the corresponding mould section may be shaped to define a draft angle of the second mould half to allow the blade to be removed from the mould. The benefit of providing the mould split along the suction side of the blade is particularly pronounced in respect of flat-back embodiments of the blade, in which the blade twists along its span, whereby the flat-back trailing edge section also twists. Thus, by arranging the mould split along the suction side of the blade, the present invention makes it possible to mould flat-back trailing edge blades which twist along their span.

DETAILED DESCRIPTION OF EMBODIMENTS OF THE INVENTION

Embodiments of the invention will now be described further with reference to the accompanying figures, in which.

Figure 1:
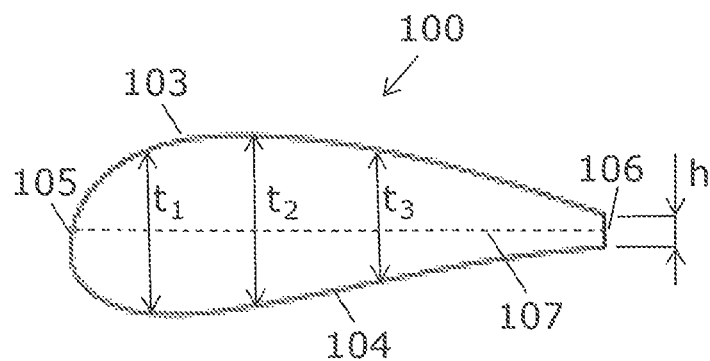
FIG. 1 shows an airfoil constituting a cross-section of a wind turbine blade.

The airfoil 100 of FIG. 1 comprises a suction side surface 103, a pressure side surface 104, a leading edge section 105, and a flat-back trailing edge section 106. Reference numeral 107 in FIG. 1 designates the chordline of the airfoil. The outer walls of the airfoil constitute a shell structure, which is made from fibre-reinforced resin. The shell may be self-supporting, i.e. self-bearing, or it may be reinforced by appropriate structure (not shown), such as one or more spars extending in a lengthwise direction of the blade, i.e. extending out of the airfoil plane depicted in FIG. 1. The thicknesses of the blade at various positions along the chordline are denoted $t_1$, $t_2$ and $t_3$ in FIG. 1, and the height of the flat-back trailing edge is denoted h.

Figure 2:
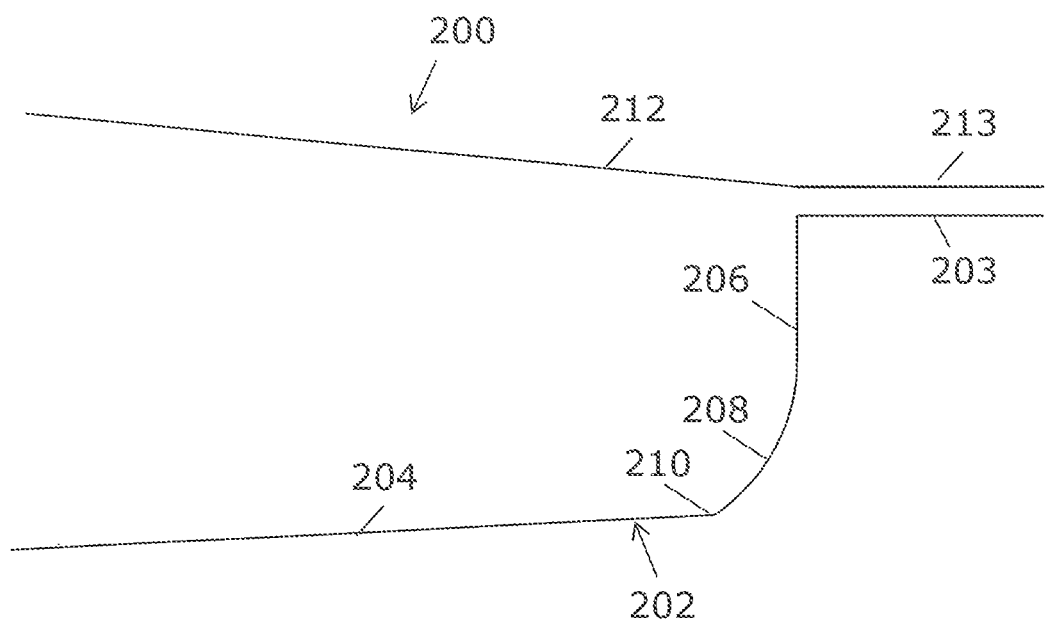
FIG. 2 illustrates a trailing edge part of a mould for manufacturing a blade structure according to the present invention.

The shell structure of the blade is formed by laying up of layers of fibres, such as fibre mats, in respective mould halves, into which resin is filled by injection or infusion. FIG. 2 shows a trailing edge detail of an embodiment of a cross-section of a mould 200 for the manufacture of a blade according to the first aspect of the invention by the method according to the second aspect of the invention. A lower mould half 202 defines the pressure side 104 of the blade structure as well as its flat-back trailing edge section 106. A rounded section of the mould 208 interconnects a first portion 204 of the lower mould half 202, which forms the pressure side surface 104 of the blade 100, and a second portion 206 of the lower mould half, which forms the flat-back trailing edge section 106 of the blade 100. At a transition point 210 between the first mould portion 204 and the second mould portion 206, the interior of the mould 200 forms a sharp corner. An upper mould half 212 forms and defines the suction side surface 103 of the blade 100. The lower and upper mould parts 202 and 212 form flanges 203 and 213, at which they may be clamped together or otherwise attached to each other when the lower mould half 202 and the upper mould half 212 are brought together.

Figure 3:
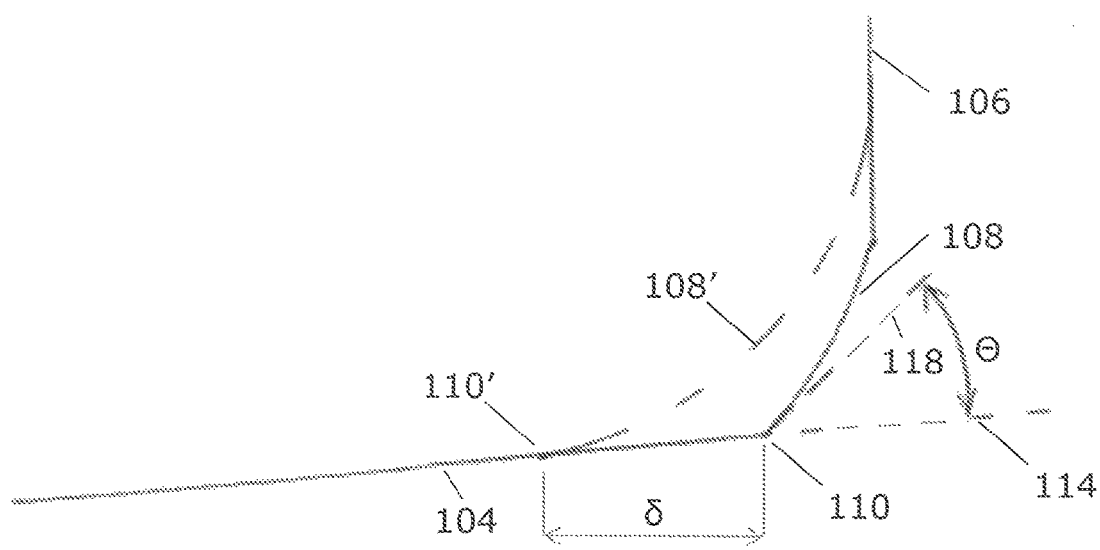
FIG. 3 illustrates a portion of a pressure side of a blade according to the present invention in the vicinity of the trailing edge section thereof as well as a portion of the trailing edge section itself.

FIG. 3 shows a partial detail of an embodiment of a trailing edge section of the blade generally depicted in FIG. 1 formed in a mould as shown in FIG. 2. The blade comprises a pressure side surface 104 and a flat-back trailing edge section 106, which are interconnected by a rounded connecting section 108. At a transition point 110 between the pressure side surface 104 and the rounded connection section 108, the surface of the blade forms a sharp corner, at which a tangent 114 of the pressure side section does not coincide with the rounded connecting section's tangent 118. As shown in FIG. 3, that part of the pressure side's tangent 114, which extends away from the airfoil (from left to right in FIG. 3), and that part of the connecting section's tangent 118, which extends towards the suction side of the airfoil (upwardly in FIG. 3), form a mutual angle θ. In preferred embodiments of the invention, the angle θ is 60° or less, such as from about 10° to about 60°, such as in the range from about 25° to about 35°.

Due to the non-coinciding tangents, the airfoil forms a sharp corner at the transition point 110, which may cause controlled flow separation, and which extends the aerodynamically effective surface of the pressure side 104 of the airfoil by a distance δ as compared to an airfoil according to the prior art comprising a rounded connecting section 108', the tangent of which coincides with the pressure side's tangent at the transition point 110'.

Figure 4:
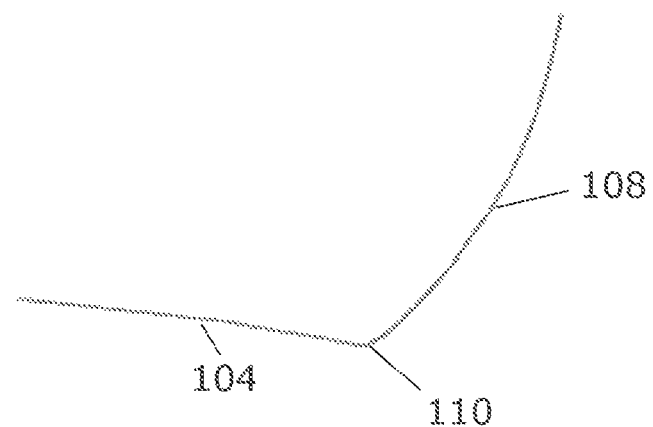
FIGS. 4-6 show partial views of three alternative embodiments of a trailing edge part of a blade according to the invention.
Figure 5:
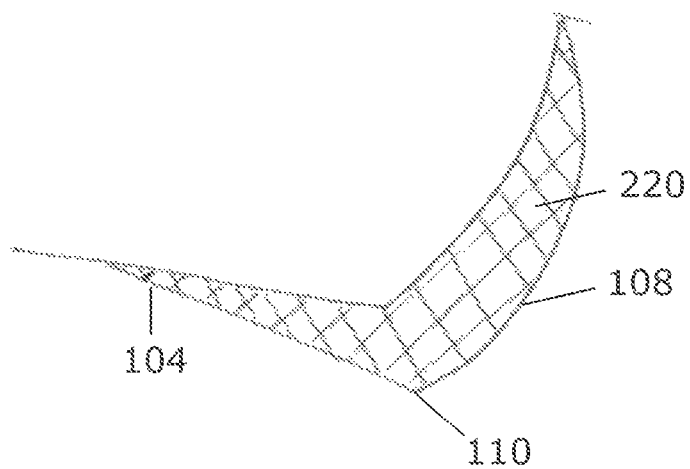
Figure 6:
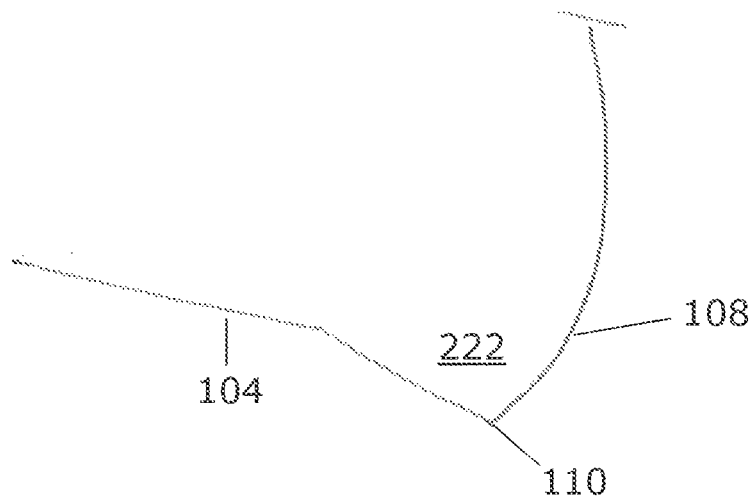

FIGS. 4-6 illustrate details of embodiments of a trailing edge part of a blade structure according to the present invention. FIG. 4 shows a basis shape as shown in FIG. 3. In the embodiments of FIGS. 5 and 6, the thickness of the blade increases towards the trailing edge section of the airfoil in the vicinity of the trailing edge section, the thickness of the airfoil being defined as a straight-line distance between the pressure side and the suction side when measured in a direction perpendicular to the chordline. The area of increased thickness may be provided as a separate element 220 as shown in FIG. 5, such as a non-structural element made e.g. from foam or rubberised material, attached to a main part of the blade. Alternatively, the area of increased thickness may be provided as an integrated part 222 of the blade structure as shown in FIG. 6.

The invention claimed is:

1. A blade for a wind turbine, the blade extending in its lengthwise direction from a hub portion to a tip portion of the blade and in its chordwise direction from a leading edge to a trailing edge of the blade, wherein a part of the blade defines an airfoil in a cross section extending transversely to the lengthwise direction, the airfoil having an outer surface defining:
   a leading edge section and trailing edge section;
   a pressure side section and an opposed suction side section extending between and interconnecting the leading edge section and the trailing edge section;
   a convex rounded connecting section interconnecting the pressure side section and the trailing edge section;
   wherein the convex rounded connecting section attaches to the pressure side section at a transition point, in which the pressure side section's tangent does not coincide with the convex rounded connecting section's tangent, so that the outer surface of the airfoil has a sharp corner at said transition point, and wherein at least the leading edge section, the trailing edge section, and the convex rounded connecting section are integrally formed together as a unitary piece.

2. The blade according to claim 1, wherein the convex rounded connecting section's tangent forms an angle from about 10° to about 60° to the pressure side's tangent.

3. The blade according to claim 1, wherein the trailing edge section is a flat-back trailing edge section.

4. The blade according to claim 1, wherein the ratio between a height of the trailing edge section and a chord length of the blade is between 2% and 15%.

5. The blade according to claim 1, wherein the height of the trailing edge section is larger at a first point along the length of the blade than at a second point along the length of the blade, the second point being closer to the tip portion than the first point.

6. The blade according to claim 1, wherein the airfoil defines a chord line, and wherein, at any position along the chordline, a thickness of the airfoil is defined as a straight-line distance between the pressure side and the suction side when measured in a direction perpendicular to the chordline, and wherein, in the vicinity of the trailing edge section, the thickness of the blade increases towards the trailing edge section of the airfoil.

7. A blade for a wind turbine, the blade extending in its lengthwise direction from a hub portion to a tip portion of the blade and in its chordwise direction from a leading edge to a trailing edge of the blade, wherein a part of the blade defines an airfoil in a cross section extending transversely to the lengthwise direction, the airfoil having an outer surface defining:
   a leading edge section and trailing edge section;
   a pressure side section and an opposed suction side section extending between and interconnecting the leading edge section and the trailing edge section;
   a rounded connecting section interconnecting the pressure side section and the trailing edge section;
   wherein the rounded connecting section attaches to the pressure side section at a transition point, in which the pressure side section's tangent does not coincide with the rounded connecting section's tangent, so that the outer surface of the airfoil has a sharp corner at said transition point, wherein a ratio between a curvature radius of the rounded connecting section and a height of the trailing edge section defined as a straight-line distance between the pressure side and the suction side of the airfoil at the trailing edge section is between 0.01 and 1.

8. The blade according to claim 7, wherein the ratio between the curvature radius of the rounded connecting section and the height of the trailing edge section is between 0.01 and 0.2.

9. The blade according to claim 7, wherein the airfoil defines a chord line, and wherein, at any position along the chordline, a thickness of the airfoil is defined as a straight-line distance between the pressure side and the suction side when measured in a direction perpendicular to the chordline, and wherein, in the vicinity of the trailing edge section, the thickness of the blade increases towards the trailing edge section of the airfoil.

10. The blade according to claim 9, wherein, in at least that area of the airfoil which has an increased thickness, the increased thickness is provided as a separate element attached to a main part of the blade.

11. A method of manufacturing a blade structure for a wind turbine, the blade extending in its lengthwise direction from a hub portion to a tip portion of the blade and in its chordwise direction from a leading edge to a trailing edge of the blade, wherein a major part of the blade defines an airfoil in a cross section extending transversely to the lengthwise direction, the airfoil having an outer surface defining:
   a leading edge section and trailing edge section;
   a pressure side section and an opposed suction side section extending between and interconnecting the leading edge section and the trailing edge section;
   a rounded connecting section interconnecting the pressure side section and the trailing edge section;
   wherein the rounded connecting section attaches to the pressure side section at a transition point, in which the pressure side section's tangent does not coincide with the rounded connecting section's tangent, so that the outer surface of the airfoil has a sharp corner at said transition point;
   said method comprising the steps of:
   providing a mould for the blade or a segment thereof, the mould comprising an upper mould half shaped to define the suction side of the airfoil, and a lower mould half shaped to define to define the pressure side of the airfoil, and wherein, in a trailing edge section of the airfoil, the lower mould half further defines the trailing edge section of the airfoil;
   providing layers of a fibrous material in the respective upper and lower mould halves;
   assembling the upper and lower mould halves;
   filling a resin into the mould;
   curing the resin;
   removing the structure thus manufactured from the mould.

* * * * *